US012602812B2

(12) United States Patent
Schramm

(10) Patent No.: US 12,602,812 B2
(45) Date of Patent: Apr. 14, 2026

(54) MITIGATING EFFECTS CAUSED BY REPEATED AND/OR SPORADIC MOVEMENT OF OBJECTS IN A FIELD OF VIEW

(71) Applicant: Evolon Technology, Inc., Dallas, TX (US)

(72) Inventor: Steven Schramm, Los Alamos, NM (US)

(73) Assignee: Evolon Technology, Inc., Dallas, TX (US)

( * ) Notice: Subject to any disclaimer, the term of this patent is extended or adjusted under 35 U.S.C. 154(b) by 888 days.

(21) Appl. No.: 17/131,376

(22) Filed: Dec. 22, 2020

(65) Prior Publication Data

US 2021/0192905 A1     Jun. 24, 2021

Related U.S. Application Data

(60) Provisional application No. 62/953,117, filed on Dec. 23, 2019.

(51) Int. Cl.
| | |
|---|---|
| *G06T 7/70* | (2017.01) |
| *G06F 18/2431* | (2023.01) |
| *G06T 3/40* | (2006.01) |
| *G06T 7/11* | (2017.01) |
| *G06T 9/00* | (2006.01) |
| *G06V 10/20* | (2022.01) |
| *G06V 20/20* | (2022.01) |
| *G06V 20/40* | (2022.01) |
| *G06V 20/52* | (2022.01) |
| *G08B 13/196* | (2006.01) |

(Continued)

(52) U.S. Cl.
CPC ........... *G06T 7/70* (2017.01); *G06F 18/2431* (2023.01); *G06T 3/40* (2013.01); *G06T 7/11* (2017.01); *G06T 9/00* (2013.01); *G06V 10/255* (2022.01); *G06V 20/20* (2022.01); *G06V 20/41* (2022.01); *G06V 20/52* (2022.01); *G08B 13/19604* (2013.01); *G08B 13/19606* (2013.01); *G08B 13/19673* (2013.01); *G08B 13/19689* (2013.01); *G08B 29/185* (2013.01); *H04N 7/185* (2013.01); *H04N 7/56* (2013.01); *H04N 23/67* (2023.01); *H04N 23/69* (2023.01); *H04N 23/695* (2023.01); *G06T 2207/20132* (2013.01); *G08B 21/18* (2013.01)

(58) Field of Classification Search
CPC ..... G06T 7/70; G06T 3/40; G06T 7/11; G06T 9/00; G06T 2207/20132; G06F 18/2431; G06V 10/255; G06V 20/20; G06V 20/41; G06V 20/52; G08B 13/19604; G08B 13/19606; G08B 13/19673; G08B 13/19689; G08B 29/185; G08B 21/18; H04N 7/185; H04N 7/56; H04N 23/67; H04N 23/69; H04N 23/695; H04N 7/181; H04N 23/61; H04N 23/80
See application file for complete search history.

(56) References Cited

U.S. PATENT DOCUMENTS

| | | | | |
|---|---|---|---|---|
| 2009/0066790 A1* | 3/2009 | Hammadou | ........... | H04N 23/82 348/E5.062 |
| 2016/0042621 A1* | 2/2016 | Hogg | ..................... | H04N 23/64 348/155 |
| 2019/0306408 A1* | 10/2019 | Hofer | ..................... | H04N 23/90 |

* cited by examiner

*Primary Examiner* — James J Yang
(74) *Attorney, Agent, or Firm* — Schultz & Associates, P.C.

(57) ABSTRACT

The present application describes a system and method for mitigating false alarms caused by repeated and/or sporadic (Continued)

movement of objects in a field of view of an image capture
device.

4 Claims, 6 Drawing Sheets

(51)  Int. Cl.

| | |
|---|---|
| *G08B 29/18* | (2006.01) |
| *H04N 7/18* | (2006.01) |
| *H04N 7/56* | (2006.01) |
| *H04N 23/67* | (2023.01) |
| *H04N 23/69* | (2023.01) |
| *H04N 23/695* | (2023.01) |
| *G08B 21/18* | (2006.01) |

400

CAPTURE IMAGE(S) —410

DETECT OBJECT(S) OF INTEREST —420

IDENTIFY AREA(S) OF INTEREST ASSOCIATED WITH OBJECT OF INTEREST —430

AREAS OF INTEREST OVER AREA THRESHOLD? —440

YES

NO

RESET INTRUSION DETECTION PARAMETERS —460

IGNORE MOVEMENT IN AREA(S) OF INTEREST —450

510 — PROCESSING UNIT

520 — SYSTEM MEMORY

530 — OPERATING SYSTEM

540 — PROGRAM MODULES

550 — INTRUSION PARAMETERS

560 — REMOVABLE STORAGE

570 — NON-REMOVABLE STORAGE

580 — COMMUNICATION SYSTEMS

590 — INPUT/OUTPUT DEVICES

500 — COMPUTING DEVICE

595 — OTHER COMPUTING DEVICES

MITIGATING EFFECTS CAUSED BY REPEATED AND/OR SPORADIC MOVEMENT OF OBJECTS IN A FIELD OF VIEW

CROSS-REFERENCE TO RELATED APPLICATION

The present application claims the benefit of U.S. Provisional Patent Application No. 62/953,117 titles "System for Scalable Processing of Video Clips" filed on Dec. 23, 2019, the entire disclosure of which is hereby incorporated by reference in its entirety.

BACKGROUND

Camera-to-camera control systems are typically used to monitor various areas and detect the presence of intruders. However, the accuracy of these camera-to-camera control systems may be adversely affected by various objects that periodically or sporadically move within a captured scene.

SUMMARY

The present application describes a system and method for mitigating false alarms in camera-to-camera control systems caused by objects that move within a scene. In some examples, the objects may move as a result of environmental conditions such as rain, snow, leaves and so on. The false alarms are mitigated by causing an image analysis system of the camera-to-camera control system to determine an area of interest corresponding to the object. If the object continues to move within the area of interest for a predetermined time period, movement of the object within the area of interest is ignored. In examples, the movement of the object within the area of interest is ignored until a threshold associated with a time parameter and/or a threshold associated with an area parameter has been met or exceeded.

Accordingly, the present application describes a method that includes receiving a series of captured images of a particular scene over a time period and detecting an object of interest in the particular scene using at least a portion of the captured images. An area within the particular scene is identified and a dimension of the area corresponds to a dimension of the object of interest. A determination is made as to whether the object of interest is detected within the area over a threshold number of times within the time period. Based on determining the object of interest is detected within the area over the threshold number of times, the object of interest within the area is ignored.

Also described is a system comprising a processor and a memory coupled to the processor. The memory stores computer executable instructions that, when executed by the processor, perform operations. These operations include detecting a first object of interest in a first area within a field of view of an image capture device. When the object of interest is detected over a threshold number of times within a particular time period, the system ignores the first object of interest in the first area. A second object of interest is detected in a second area within the field of view of the image capture device. The system ignores the second object of interest in the second area when the object of interest is detected over the threshold number of times within the particular time period. Detection parameters associated with the first area and the second area are reset based on determining a total area of the first area and second area exceed an area threshold.

The present application also describes a method that includes detecting an object of interest within a field of view of an image capture device and identifying an area associated with the object of interest. An intrusion detection system may ignore changes within the area until expiration of a time parameter based on determining the object of interest is detected within the area over a threshold number of times within a particular time period.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
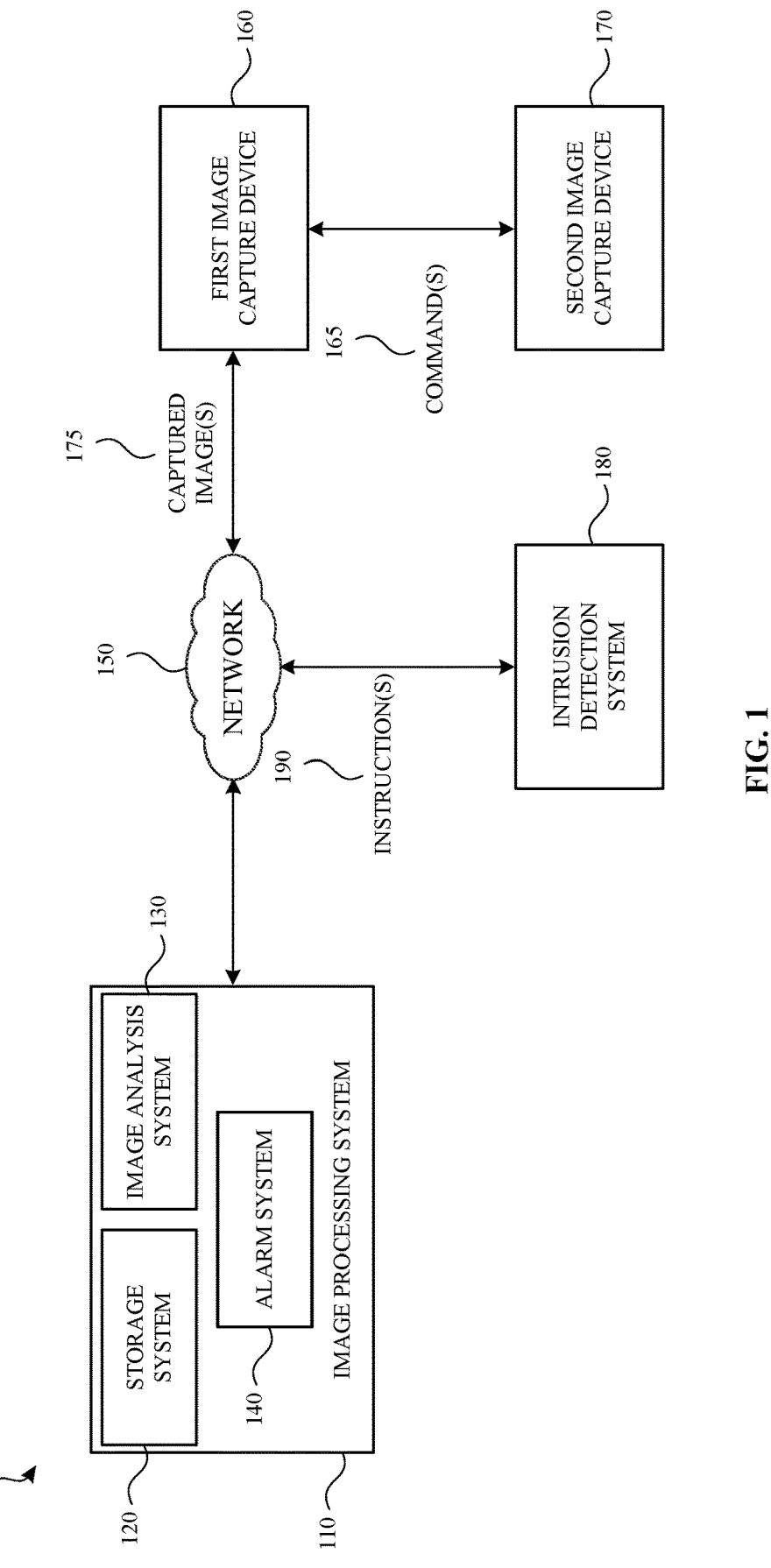
FIG. 1 illustrates an example system for mitigating the effects of objects that periodically or sporadically move within a scene captured by a camera-to-camera control system according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Camera-to-camera control systems typically include a first camera (or other such image capture device) having a fixed field of view and a second camera (e.g., a pan, tilt and zoom (PTZ) camera) that is moveable (e.g., in response to instructions received from the first camera) within the fixed field of view of the first camera. In an example, the first camera and/or the second camera may detect or otherwise identify an object of interest within the fixed field of view. The object of interest can be detected and/or identified based, at least in part, on user input. In another example, the object of interest can be detected and/or identified based, at least in part, by comparing one or more captured images to one or more reference images. Any differences in pixel values between the images may denote movement of an object of interest. As the object of interest moves through the fixed field of view, the first camera may send movement instructions to the second camera that causes the second camera to track the movement of the objects of interest in real-time or substantially real-time. In some examples, when an object of interest is identified, an alarm (or similar notification) may be triggered by and/or provided to an intrusion detection system.

However, certain objects that are present and accounted for in the field of view of the first camera and/or the second camera may trigger false alarms due to periodic or sporadic movement. For example, environmental conditions, such as snow, rain, dust, wind, leaves etc. may cause the object to move and trigger a false alarm. For example, a tarp, flag, covering, etc. in a particular scene may move or flap in response to wind or other environmental conditions and trigger the occurrence of an alarm.

In an effort to mitigate false alarms caused by environmental conditions such as described above, the present application describes a process for detecting movement of an object and determining whether to ignore the movement of the object for a predetermined or specified amount of time. For example, when an object of interest is detected in a field of view of an image capture device, an alert condition may be triggered and an area of interest in which the object of interest is detected is identified. The area of interest may be defined by a bounding box (e.g., rectangular, square, or other shape). In another example, the area of interest may be defined by a discrete contiguous group of pixels. In some examples, the identified area of interest has dimensions that may be equivalent, substantially equivalent, or otherwise associated with one or more dimensions of the object of interest.

The area of interest may be monitored to detect additional movement of the object of interest. If the object of interest moves within the area of interest a predetermined number of times and/or within a predetermined time period, the system may determine that the object of interest is moving as a result of environmental conditions (e.g., wind is causing a tarp to flap). Any further movement of the object within that area of interest is ignored. In an example, movement of the object of interest within the area of interest is ignored for a predetermined or specified amount of time. Once the predetermined amount of time has lapsed, intrusion detection parameters associated with the identified area of interest are reset and the system no longer ignores movement in that area.

In some examples, multiple different areas of interest within a field of view of an image capture device may be identified as areas of interest. For example, a particular scene may have a number of tarps or covers in a scene and each tarp or cover may flap or otherwise move in the wind. As each of these areas of interest are identified, the system may ignore each of the areas of interest. As a result, a significant part of the field of view of the image capture device may also be ignored. As this could be detrimental to intrusion detection, the system may be configured to reset intrusion detection parameters once a total area of the areas of interest exceed an area threshold and the system will stop ignoring movement in one or more of the areas of interest.

These and other examples will be explained in more detail below with respect to FIG. 1-FIG. 5.

FIG. 1 illustrates an example system 100 for mitigating false alarms caused by objects that move within an area of interest. In some examples, the object may move within the area of interest in response to environmental conditions.

Although environmental conditions are specifically mentioned, other forms of movement, and their associated causes, are contemplated.

The system 100 may be a camera-to-camera control system. Although a camera-to-camera control system is specifically mentioned, the system 100, or portions of the system 100, may be implemented by any type of system that captures live and/or still images including, for example, single camera systems or multiple camera systems.

In an example, the system 100 includes an image processing system 110. The image processing system 110 may include a storage system 120, an image analysis system 130 and an alarm system 140.

The system 100 may also include a number of different image capture devices. In the example shown, the system 100 includes a first image capture device 160 and a second image capture device 170. In an example, the first image capture device 160 is a stationary image capture device and the second image capture device 170 is a moveable image capture device. The moveable image capture device may be a PTZ camera.

In an example, the first image capture device 160 and the second image capture device 170 are communicatively coupled such that commands 165, instructions, images, etc. may be communicated between each image capture device. For example, if analysis of an image captured by the first image capture device 160 indicates that an object of interest is detected, the first image capture device 160 may send pan, tilt and/or zoom instructions to the second image capture device 170 that causes the second image capture device 170 to track movement of the object of interest as the object of interest moves through and/or within the field of view (or scene) of the first image capture device 160. Although two image capture devices are shown, the system 100 may include any number of image capture devices. In another example, the first image capture device 160 and/or the second image capture device 170 may receive commands 165 from an intrusion detection system 180.

In an example, the first image capture device 160 and/or the second image capture device 170 may capture one or more images (represented as captured images 175). Once the one or more images are captured, the captured images 175 are provided to the image processing system 110. In an example, the captured images 175 are provide to the image processing system 110 over a network 150. Although a network 150 is specifically mentioned, other communication channels (e.g., Bluetooth, cable connection, infrared) may be used.

When the image processing system 110 receives the captured images 175, the captured images 175 may be stored (temporarily or permanently) in the storage system 120. The storage system 120 may provide the captured images 175 to the image analysis system 130.

The image analysis system 130 compares the captured images 175 to one or more reference images. The reference images may be stored in the storage system 120. The captured images 175 are compared to the reference images in order to detect an object of interest. In some examples, the object of interest is detected by identifying changes in pixel values between the captured images 175 and the reference images. A change in group of pixel values in a particular area may denote movement in that area.

In an example, once an object of interest is detected, an alarm system 140 may generate or otherwise place a bounding box (or other such delimiter) around the object of interest. One or more dimensions of the bounding box may be substantially the same as or similar to one or more dimensions of the object of interest.

Figure 2A:
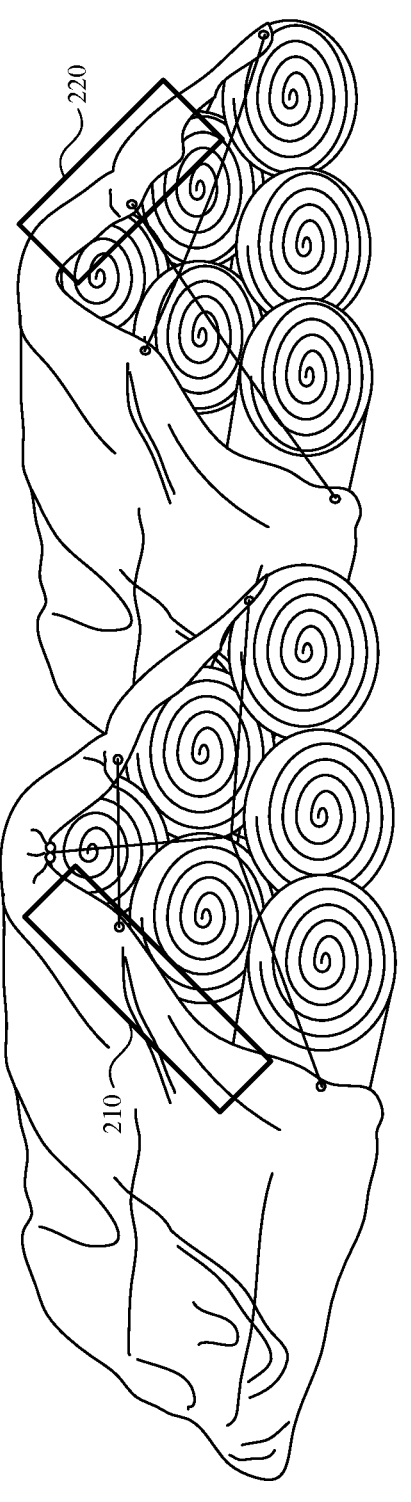
FIG. 2A illustrates an example scene in which multiple areas of interest are identified in a scene according to an example.
Figure 2B:
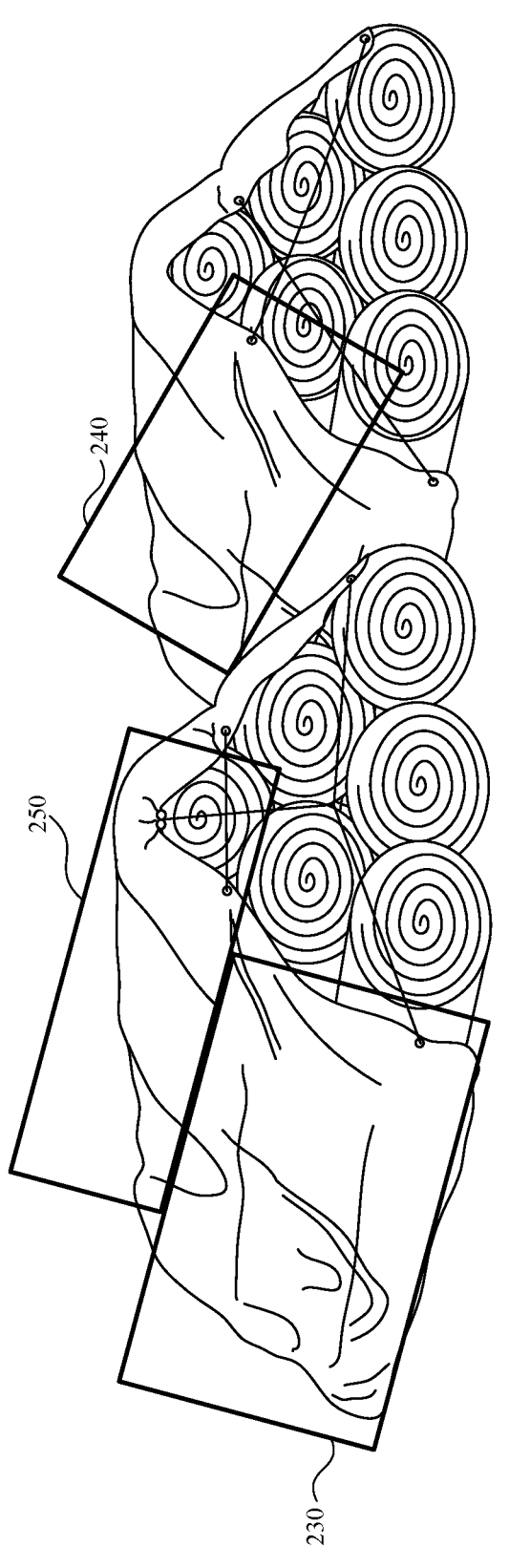
FIG. 2B illustrates another example scene in which multiple areas of interest are identified in a scene according to an example.

For example and referring to FIG. 2A, one or more bounding boxes (e.g., bounding box 210 and/or a bounding box 220) may be provided in a captured image 200 or scene. The captured image 200 may be provided on a display of a computing device associated with the intrusion detection system 180 (FIG. 1).

As shown in FIG. 2, the bounding boxes may be used to denote an area of interest and are provided around or are otherwise associated with an object of interest. In this example, the object of interest may be a portion of a tarp or other such covering that moves due to environmental conditions. Although a tarp or other covering is specifically mentioned, this is for example purposes only. The object of interest could be any object within a scene that moves or would otherwise trigger an alert or alarm as a result of sporadic or periodic movement caused by environmental conditions or other factors.

In an example, the bounding boxes have dimensions that are equivalent to or are substantially equivalent to dimensions of the object of interest. In some examples, the bounding box may be associated with a portion of the object as a whole. For example, in FIG. 2A, bounding box 210 and bounding box 220 are associated with respective portions of the tarp because the portions surrounded by the bounding boxes are the only portions of the tarp that may be moving.

Referring back to FIG. 1, the alarm system 140 may provide an alarm notification to an intrusion detection system 180 notifying the intrusion detection system 180 of the detected object of interest and its associated movement. Although the intrusion detection system 180 is shown as a separate system from the image processing system 110, the image processing system 110 may be integrated with the intrusion detection system 180.

In addition to generating a bounding box, the alarm system 140 (in conjunction with the image analysis system 130) may also detect or otherwise determine whether the object of interest remains in the area of interest denoted by the bounding box. This determination may be made by determining whether a centroid pixel (or a centroid group of pixels) of the object of interest is located by, or can otherwise be associated with, a centroid pixel (or centroid group of pixels) of the area of interest.

If the two centroid pixels remain substantially in the same area with respect to one another, the alarm system 140 and/or the image analysis system 130 may determine that the object of interest is not moving outside of the area of interest. Once this is determined, the alarm system 140 may continue to monitor the area of interest for a first predetermined amount of time (e.g., five seconds). If the object of interest is moving within the area of interest denoted by the bounding box but has not moved outside of the area of interest for a predetermined number of times (e.g., five times) over the first predetermined amount of time, the alarm system 140 may send instructions 190 to the intrusion detection system 180. The instructions 190 cause the intrusion detection system 180 (and/or the image analysis system 130) to ignore any subsequent movement of the object in the area of interest.

In an example, the area of interest may be highlighted or otherwise be displayed in a user interface associated with the intrusion detection system with particular distinguishing features such as, for example, a particular color, a particular shading, a particular outline, etc. In an example, the intrusion detection system 180 will ignore subsequent movement in the area for a second predetermined amount of time (e.g., an hour, two hours).

The first predetermined amount of time, the second predetermined amount of time and/or the predetermined number of times may be based, at least in part, on input provided by an individual. In another example, the first predetermined amount of time, the second predetermined amount of time and/or the predetermined number of times may be based, at least in part, on data provided by or otherwise received from one or more information services. For example, the alarm system 140 may receive weather information from a weather service via the network 150. The weather information may indicate that heavy rain and wind are expected in an given area for a particular duration of time. Using this information, the alarm system 140 may dynamically update and/or determine values for the first predetermined amount of time, the second predetermined amount of time and/or the predetermined number of times. In another example, the alarm system 140 may use stored information (e.g., location information of past areas of interest, times of detected movement, etc.) to determine or otherwise predict when movement may occur, a frequency of the movement and/or when the detected movement could end.

Once the second predetermined amount of time has expired, the alarm system 140 resets various intrusion detection parameters associated with the area of interest. For example, the alarm system 140 clears or otherwise deletes metadata (e.g., location information, bounding box information) associated with the area of interest. This may include metadata associated with the various bounding boxes, metadata associate with the distinguishing features, and so on. Thus, any subsequent movement in those areas within the field of view of the first image capture device 160 may again be detected by the intrusion detection system 180 and/or the image analysis system 130.

In some examples, the alarm system 140 may identify multiple areas of interest and cause the image analysis system 130 and/or the intrusion detection system 180 to ignore movement in multiple different areas such as explained above. However, if the combined area of each of the multiple different areas exceed an area threshold, the alarm system 140 may reset or otherwise clear the various intrusion detection parameters of those areas. For example and referring to FIG. 2B, the image 200 may be associated with multiple bounding boxes (e.g., bounding box 230, bounding box 240 and bounding box 250). In this example, the combined areas of the bounding boxes may exceed an area threshold. In response to a determination that the combined area of one or more of the bounding boxes exceeds an area threshold, the alarm system 140 may reset one or more intrusion parameters associated with the one or more bounding boxes.

In an example, the area threshold may be fifty percent or more of the total area of the field of view of the first image capture device 160. In another example, the area threshold may be seventy percent or more of the total area of the field of view of the first image capture device 160. The area threshold may be based, at least in part, on input provided by an individual.

In an example, the area threshold may be combined with an amount of time threshold in order to determine whether to reset some or all of the intrusion detection parameters of each of the multiple areas. For example, different areas of interest may be generated or otherwise identified at different times. Thus, each area of interest may have different amounts of time remaining until their associated intrusion detection parameters are cleared or otherwise reset.

For example, a first area of interest may have been recently detected or identified and have a lot of time remaining until its associated intrusion detection parameters are reset, while a second area of interest may have been detected or identified earlier and have a relatively short amount of time remaining before its associated intrusion detection parameters are reset. In such an example, the alarm system 140 may determine to not reset the intrusion detection parameters for all of the areas and wait until the remaining time (e.g., five minutes) associated with the second area of interest has passed.

In another example, the alarm system 140 will only reset intrusion detection parameters for areas of interest having elapsed time periods that are above a threshold. For example, if an area of interest has been identified and ignored for fifty minutes or more out of a total of an hour, the alarm system 140 may reset the intrusion detection parameters associated with that area of interest without resetting intrusion detection parameters associated with other areas of interest—provided that this action will cause the combined area of all the areas of interest to fall below the total area threshold.

Figure 3:
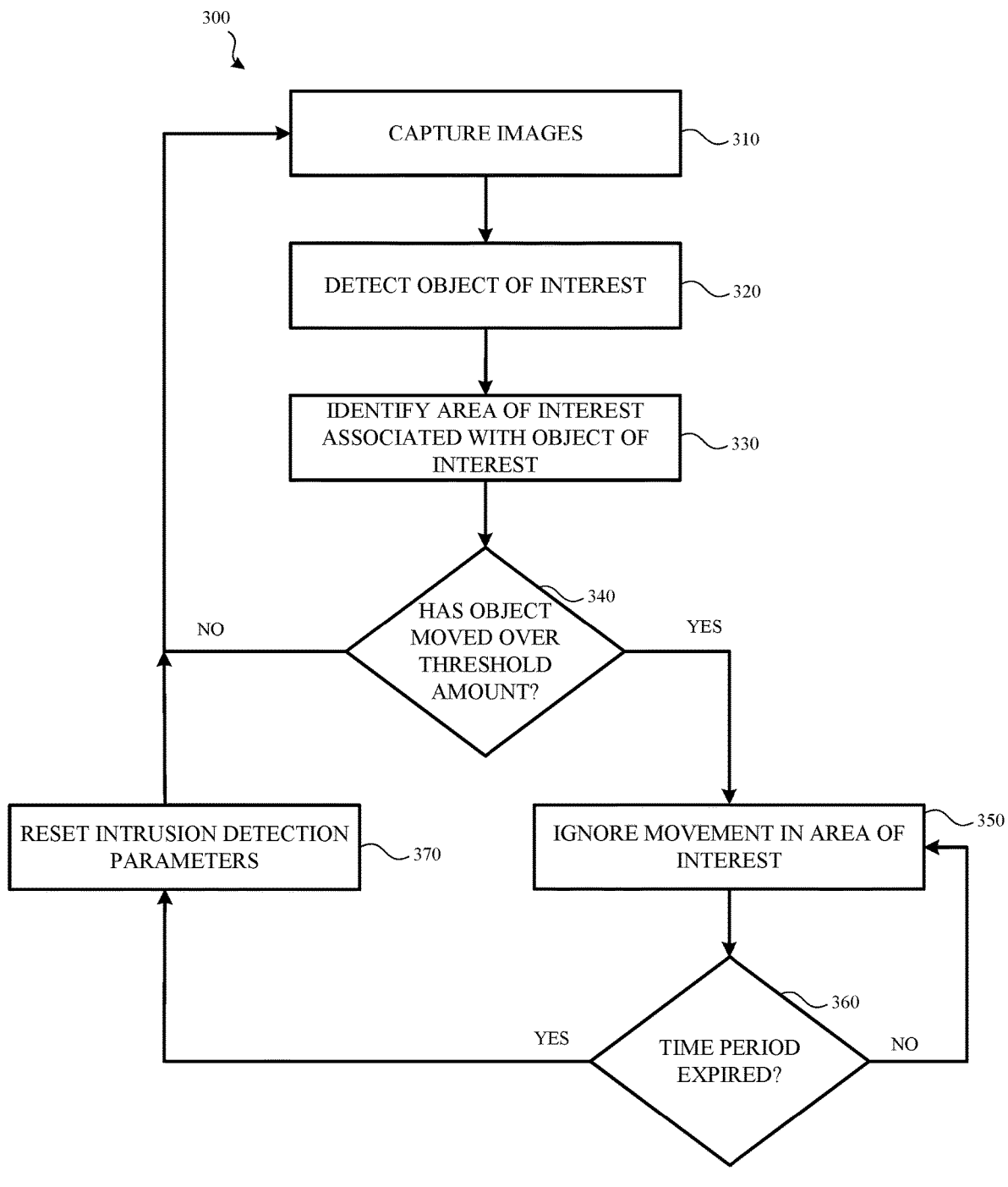
FIG. 3 illustrates a method for mitigating the effects of objects that periodically or sporadically move within a scene according to an example.

FIG. 3 illustrates a method for mitigating the effects of objects that periodically or sporadically move within a scene according to an example. The method 300 may be performed by one or more systems of the system 100 shown and described with respect to FIG. 1.

Method 300 begins when a series of images are captured (310). In an example, the series of images are captured by one or more image capture devices. In an example, the series of images may be still images. In another example, the series of images are frames of a captured video.

Once the series of images has been captured, the series of images are analyzed to detect an object of interest (320). When the object of interest is identified, an area of interest associated with the object of interest is also identified (330). In an example, a bounding box is associated with the object of interest such as described above.

Once the object of interest and the associated area of interest have been identified, a determination (340) is made as to whether the object of interest has moved (or continues to move) within the area of interest over a predetermined number of times and/or for over a particular amount of time. If the object of interest has not moved the predetermined amount and/or has not been moving for the predetermined amount of time within the area of interest, additional images may be captured (310).

However, if the object of interest has moved for over the predetermined amount and/or for the predetermined amount of time within the area of interest, any subsequent movement in the area of interest is ignored (350). In an example, movement in the area of interest is ignored until a time period has expired.

For example, if a determination (360) is made that a time period associated with the area of interest has not expired, movement in the area of interest continues to be ignored (350). However, if it is determined (360) that the time period has expired, intrusion detection parameters associated with the area of interest are reset (370) and the system will no longer ignore movement in that area of interest and the system will continue to capture images such as previously described.

Figure 4:
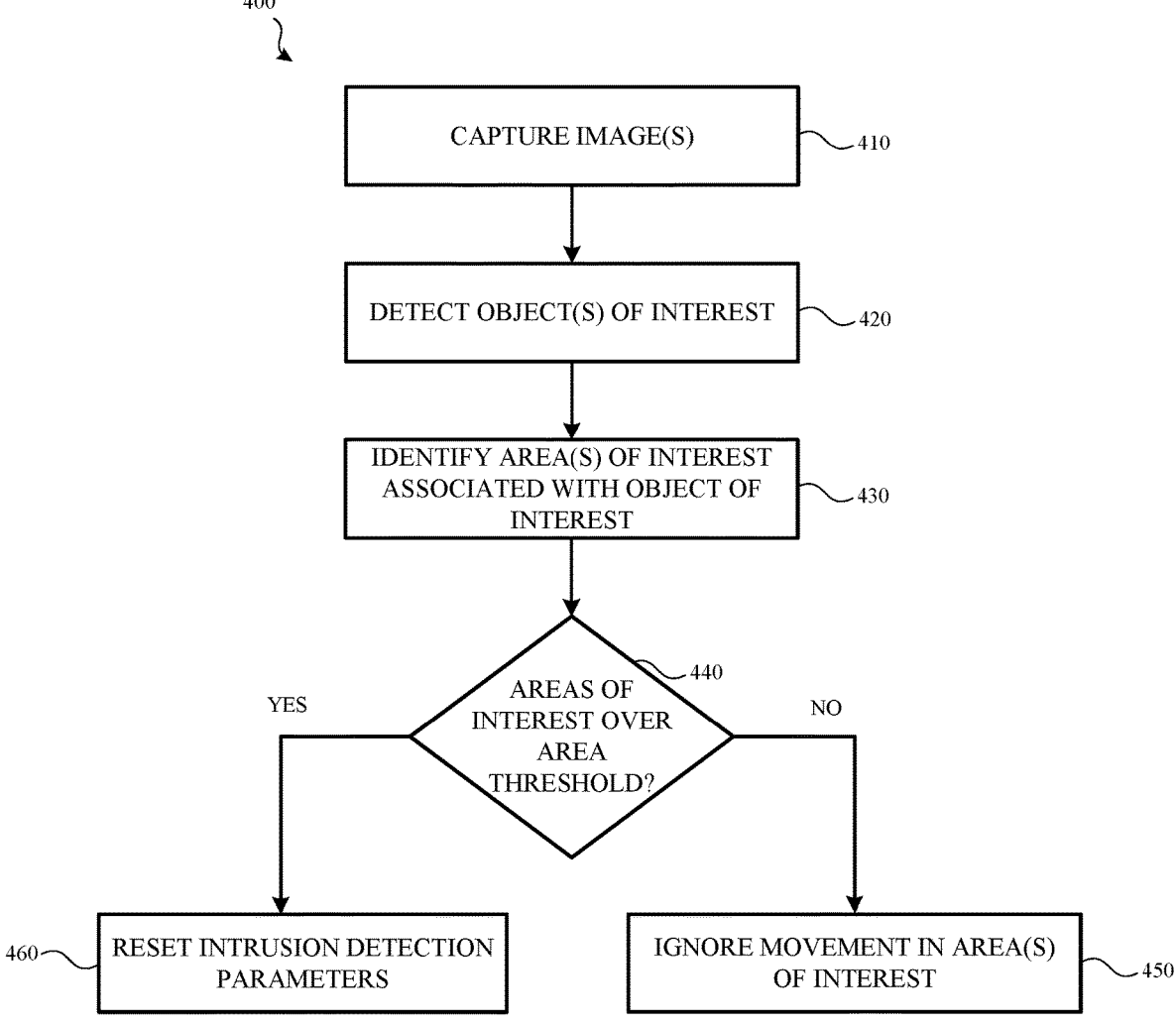
FIG. 4 illustrates a method for resetting intrusion detection parameters when a total area of objects of interest exceed an area threshold according to an example.

FIG. 4 illustrates a method 400 for resetting intrusion detection parameters when a total area of objects of interest within a captured image exceed an area threshold according to an example. The method 400 may be performed by one or more systems of the system 100 shown and described with respect to FIG. 1.

Method 400 begins when a series of images are captured (410). In an example, the series of images are captured by one or more image capture devices. In an example, the series of images may be still images. In another example, the series of images are frames of a captured video.

Once the series of images has been captured, the series of images are analyzed to detect one or more objects of interest (420). When the one or more objects of interest are identified, corresponding areas of interest are also identified (430). In an example, a bounding box is associated with the object of interest such as described above.

As bounding boxes are generated and/or as areas of interest are identified, a determination (440) is made as to whether a total area of all of the areas of interest exceed an area threshold. If it is determined that the area threshold is exceeded, intrusion detection parameters associated with one or more of the areas of interest are reset. As such, any subsequent movement in those areas of interest are no longer ignored. However, if it is determined (440) that the areas of interest do not exceed an area threshold, movement within each of the areas of interest are ignored (450).

Figure 5:
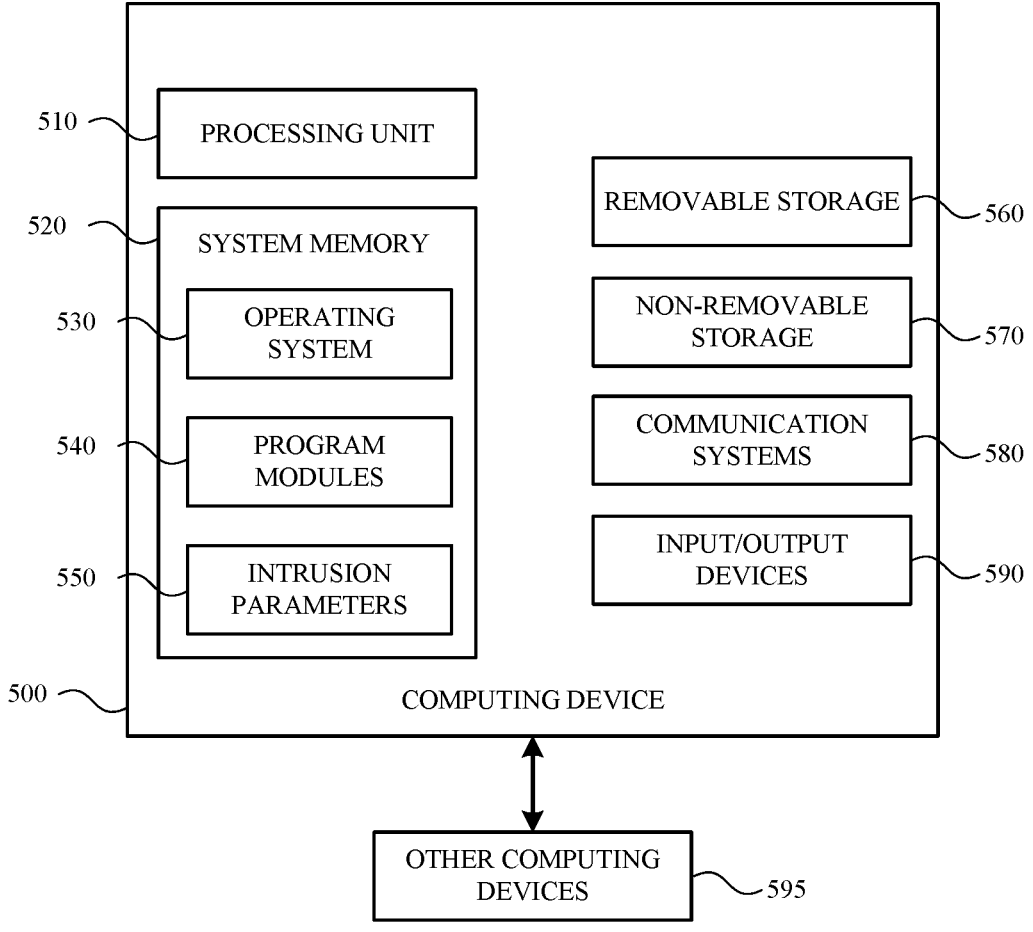
FIG. 5 is a block diagram of a computing device according to one or more examples.

FIG. 5 is a system diagram of a computing device 500 according to an example. The computing device 500, or various components and systems of the computing device 500, may be integrated or associated with an image capture device, an intrusion detection system, and/or an image processing system. As shown in FIG. 5, the physical components (e.g., hardware) of the computing device are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for gathering images, analyzing images, determining, storing and resetting intrusion parameters 550 and so on. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel ports, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
    receiving a series of captured images of a particular scene over a first time period;
    processing the particular scene with a detection system having detection parameters,
    detecting an object of interest in the particular scene using at least a portion of the captured images;
    identifying an area within and smaller than the particular scene, the area bounded by a bounding box, and a dimension of the area corresponding to a dimension of the object of interest;
    determining whether the object of interest is detected within the area over a threshold number of times within the first time period by comparing a first centroid pixel group of the object of interest to a second centroid pixel group of the bounding box; and
    based on determining whether the object of interest is detected within the area over the threshold number of times, causing the detection parameters to ignore the area until a resumption threshold has been met or exceeded;
    wherein the threshold number of times is greater than 1; and
    wherein the resumption threshold is a second time period.

2. A method, comprising:
    receiving a series of captured images of a particular scene over a first time period;
    processing the particular scene with a detection system having detection parameters,
    detecting an object of interest in the particular scene using at least a portion of the captured images;
    identifying an area within and smaller than the particular scene, the area bounded by a bounding box, and a dimension of the area corresponding to a dimension of the object of interest;
    determining whether the object of interest is detected within the area over a threshold number of times within the first time period by comparing a first centroid pixel group of the object of interest to a second centroid pixel group of the bounding box; and
    based on determining whether the object of interest is detected within the area over the threshold number of times, causing the detection parameters to ignore the area until a resumption threshold has been met or exceeded;
    wherein the threshold number of times is greater than 1; and
    wherein the resumption threshold is an area threshold.

3. A system, comprising:
    a processor;
    a memory coupled to the processor and storing computer executable instructions that, when executed by the processor, perform operations, comprising:
    selecting a series of captured images of a particular scene over a first time period;

processing the particular scene with a detection system having detection parameters, detecting an object of interest in the particular scene using at least a portion of the captured images;

identifying an area within and smaller than the particular scene, the area bounded by a bounding box, and a dimension of the area corresponding to a dimension of the object of interest; and determining whether the object of interest is detected within the area over a threshold number of times within the first time period by comparing a first centroid pixel group of the object of interest to a second centroid pixel group of the bounding box; and based on determining whether the object of interest is detected within the area over the threshold number of times, causing the detection parameters to ignore the area until a resumption threshold has been met or exceeded;

wherein the threshold number of times is greater than 1; and wherein the resumption threshold is a second time period.

4. A system, comprising:

a processor;

a memory coupled to the processor and storing computer executable instructions that, when executed by the processor, perform operations, comprising:

selecting a series of captured images of a particular scene over a first time period;

processing the particular scene with a detection system having detection parameters, detecting an object of interest in the particular scene using at least a portion of the captured images;

identifying an area within and smaller than the particular scene, the area bounded by a bounding box, and a dimension of the area corresponding to a dimension of the object of interest; and determining whether the object of interest is detected within the area over a threshold number of times within the first time period by comparing a first centroid pixel group of the object of interest to a second centroid pixel group of the bounding box; and based on determining whether the object of interest is detected within the area over the threshold number of times, causing the detection parameters to ignore the area until a resumption threshold has been met or exceeded;

wherein the threshold number of times is greater than 1; and wherein the resumption threshold is an area threshold.

* * * * *